May 18, 1965 W. C. BATES ETAL 3,184,616

HIGH LEVEL SAWTOOTH WAVEFORM VOLTAGE GENERATOR

Filed May 24, 1962

2 Sheets-Sheet 1

INVENTORS:
WILLIAM C. BATES,
THOMAS T. TRUE,
BY Joseph Levinson
THEIR ATTORNEY.

INVENTORS:
WILLIAM C. BATES,
THOMAS T. TRUE,
BY Joseph Levinson
THEIR ATTORNEY.

United States Patent Office 3,184,616
Patented May 18, 1965

3,184,616
HIGH LEVEL SAWTOOTH WAVEFORM VOLTAGE GENERATOR

William C. Bates, Clay, and Thomas T. True, Camillus, N.Y., assignors to General Electric Company, a corporation of New York Filed May 24, 1962, Ser. No. 197,505
10 Claims. (Cl. 307—107)

This invention relates to sawtooth waveform voltage generators and more particularly to relatively high level, highly linear sawtooth waveform voltage generators.

In some electrical systems which utilize electron beam display devices, a highly linear and relatively high level sawtooth beam deflection voltage at a television line frequency of 15.75 kc. must be provided. A system having this requirement is a light valve projection apparatus, one type of which is described in co-pending application Serial No. 177,658, filed March 5, 1962, and assigned to the assignee of the present invention.

A conventional circuit arrangement for providing high level sawtooth deflection voltages of the desired frequency includes a parallel resonant circuit and a means for periodically exciting the resonant circuit for a relatively short interval. Excitation, which is generally regulated by an amplifying device, consists in coupling electrical energy to the resonant circuit or causing a partial dissipation of existing energy in the circuit in order to vary the voltage level across the circuit and thereby provide a retrace portion of a sawtooth waveform. Immediately subsequent to excitation, residual circuit energy causes the resonant circuit to ring at the tuned frequency of the circuit. By tuning the resonant circuit to a frequency well below the periodic excitation frequency, a linear portion of a sinusoidal voltage variation generated therein may be utilized as a trace portion for a sawtooth waveform.

When the above described sawtooth generator is utilized for deflecting an electron beam in a display device, it is desirable, in order to eliminate distortion and other nonlinearities which would otherwise be introduced into the generated sawtooth waveform by intermediate coupling circuitry, to arrange the resonant circuit so as to generate the sawtooth voltage at a pair of deflection plates in the device. Various circuit configurations have been provided for exciting the resonant circuit in such an arrangement. In one circuit configuration an amplifying device is coupled in series with both the resonant circuit and a voltage source. Energy is injected into the resonant circuit by periodically causing current pulses to flow in the tuned circuit to thereby form a retrace segment of a sawtooth waveform. The amplifying device is subsequently cut-off and the resonant circuit rings to provide a retrace segment of the sawtooth waveform. One disadvantage of the arrangement is that when a relatively large output sawtooth waveform voltage is being generated, a high voltage source and an amplifying device suitable for handling high peak power is required. In another similar circuit configuration, a blocking oscillator discharges a charged capacitive element of the resonant circuit for providing a retrace segment of a sawtooth waveform. The latter circuit configuration is arranged in a manner for charging the capacitor from a parallel connected voltage source to form a trace portion of the generated sawtooth waveform. Although this latter arrangement provides satisfactory operation in many systems, it lacks the simultaneous high peak-to-peak sawtooth voltage and desired linearity required for such electrical systems as the aforementioned light valve system.

Accordingly, it is an object of this invention to provide an improved high level sawtooth voltage generator.

Another object of this invention is to provide a sawtooth voltage generator which simultaneously produces a relatively high level sawtooth waveform in which a trace portion of the waveform has a correspondingly good linearity characteristic.

Another object of this invention is to provide a high level sawtooth voltage generator utilizing a relatively low voltage power supply.

A further object of this invention is to provide simple and inexpensive means for generating a relatively high level sawtooth voltage.

In accordance with the present invention, a high level sawtooth voltage generator is provided comprising an inductor, energizing means for coupling electrical energy to the inductor for periodically causing the establishment and collapse of a magnetic field of the inductor, and a receptive electrical network for deriving energy from the inductor during the collapse of the magnetic field and for generating a high level sawtooth waveform voltage therefrom. The receptive network includes a parallel resonant circuit and means for coupling the resonant circuit to the inductor in a manner for providing a relatively low impedance between the inductor and resonant circuit during occurrence of the collapsing field and a relatively high impedance therebetween during the establishment of the field.

In one embodiment of the invention the inductor comprises a transformer and the energizing means includes an amplifying device which is coupled to a winding on the transformer. An electrical signal of frequency $f_1$ is coupled to a control electrode of the amplifying device and causes the periodic flow of current in the winding and the consequent establishment and collapse of a magnetic field in the transformer. A parallel resonant circuit tuned to a frequency $f_2$, where $f_1>f_2$, is coupled to a winding of the transformer by a diode and an associated bias circuit. The coupling diode is poled and biased in a manner for transferring energy from the magnetic field to the resonant circuit during collapse of the field in order to provide a retrace segment of a sawtooth voltage and for substantially isolating the resonant circuit and the inductor subsequent to the field collapse for providing a trace segment of a sawtooth voltage.

Further objects, features and the attending advantages of the invention will be apparent with reference to the following specification and drawings in which.

Figure 1:
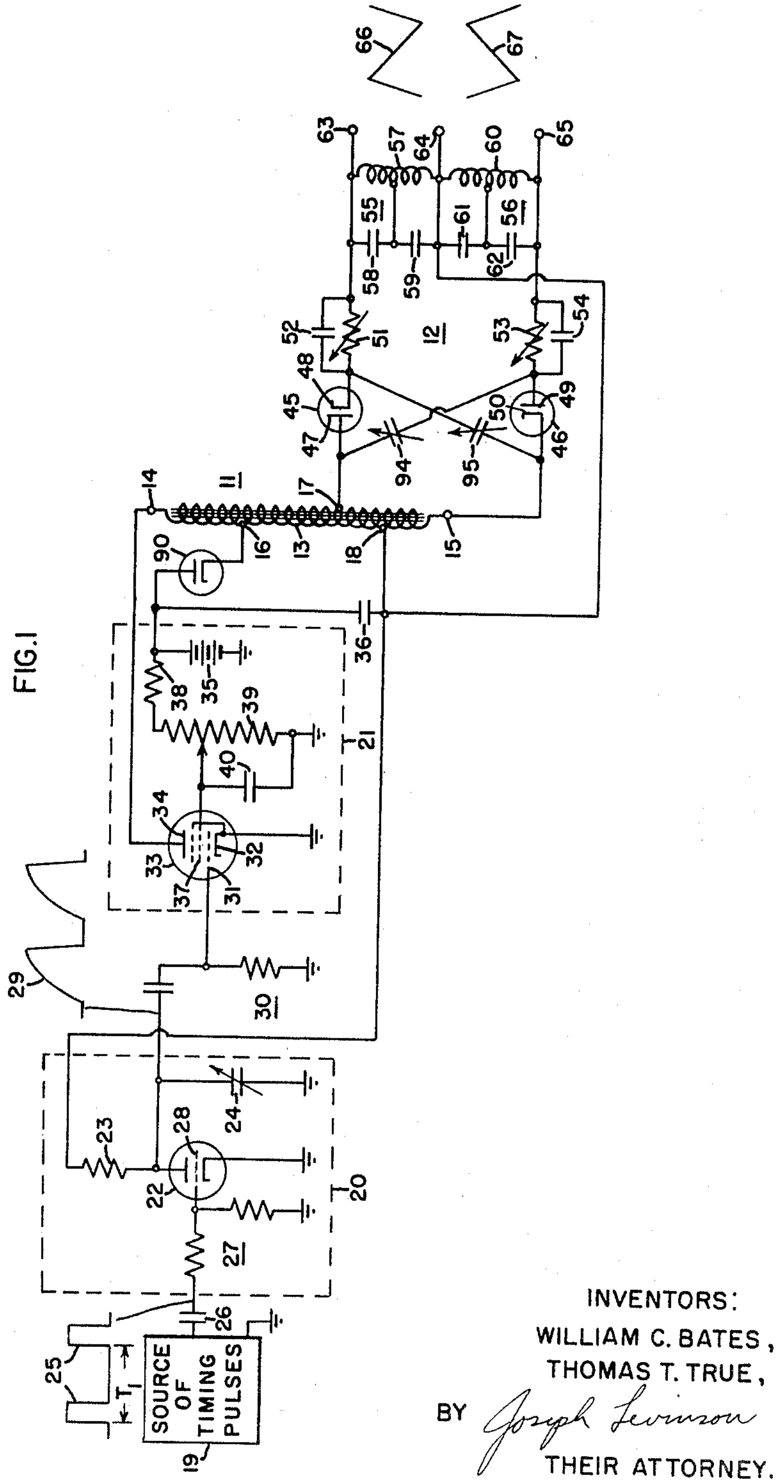
FIGURE 1 is a diagram, partly in block form of a sawtooth voltage generator embodying the present invention.

For an explanation of the arrangement and operation of one embodiment of the present invention, reference is now made to the sawtooth voltage generator illustrated in FIGURE 1. The generator includes an inductive element 11 for storing electrical energy in its magnetic field during a trace portion of the sawtooth cycle and for transferring energy to a receptive circuit, indicated generally by 12, during a retrace portion of the sawtooth cycle. Inductor 11 is shown to comprise a conventional autotransformer having a core of ferromagnetic material, a winding 13 positioned on the core, and means for making connections to various points on the winding including terminals 14, 15, 16, 17 and 18. Although an autotransformer is illustrated in FIGURE 1, other inductor configurations may equally well be used such as a transformer having separate primary and secondary windings.

A means for causing the periodic establishment and collapse of a magnetic field of the inductor includes a conventional source of timing pulses 19, a relatively low level sawtooth waveform generator 20, and an inductor driver circuit 21. The low level sawtooth generator 20 comprises a triode amplifying device 22, a resistive load impedance 23 and a wave shaping capacitor 24. Operating anode voltage for the triode 22 is derived from a voltage supply "boost" circuit described hereinafter. Voltage pulses 25 having a repetition rate in the order of television line frequencies, i.e., 15.75 kc., are provided by the source 19 and coupled from the source via a coupling capacitor 26 and resistive pulse shaping network 27 to a control electrode 28 of the triode 22. The pulse source 19 consists of any conventional voltage pulse generator and when the present invention is utilized in a television receiving system it may consist of a source of separated synchronizing pulses in a television receiver.

The circuit 20 operates conventionally in that the triode which is biased to cut-off during a negative portion of the pulses 25 is driven into relatively heavy conduction by the positive portions of pulses 25. The capacitor 24 discharges primarily through the beam resistance of the triode toward ground potential during the occurrence of a pulse and charges exponentially through resistor 23 toward the anode supply voltage when triode 22 is cut-off to provide a relatively low level sawtooth voltage output waveform 29 across the capacitor 24. The sawtooth waveform 29 is coupled via an RC coupling network 30 between a pair of input electrodes consisting of a control electrode 31 and cathode electrode 32 of a pentode amplifying device 33 in the driver circuit 21.

The function of the circuits 19 and 20 is to provide a relatively low level sawtooth voltage waveform of television line frequency at the control electrode 31. It will be apparent that other conventional circuit arrangements for providing this function may be substituted therefor. For example, a conventional free running or triggered multivibrator capable of providing the desired waveform 29 at electrode 31 may equally well be utilized.

The inductor driver circuit 21 is conventionally arranged. An amplifying pentode 33 is provided and includes a pair of output electrodes consisting of anode 34 and cathode 32 coupled in series with input terminals 14 and 18 of an inductor 11, and a source of anode potential 35. The source of anode potential includes a B+ boost capacitor 36 to be discussed more fully hereinafter. In order to provide manual amplitude control of a desired sawtooth output waveform, a circuit for regulating a voltage at a screen electrode 37 of amplifying device 33 is also provided and includes a serially connected resistor 38 and a potentiometer 39, which is by-passed by a capacitor 40, coupled between the voltage source 35 and ground potential.

A receptive electrical network 12 for generating high level balanced sawtooth output voltage waveforms is connected to output terminals 15, 17 and to a terminal 18 of the inductor 11. In accordance with a feature of the present invention, the network 12 comprises a pair of unilateral circuit elements shown to be diodes 45 and 46 having anode and cathode electrodes 47, 48 and 49, 50 respectively, associated diode biasing means comprising the RC combinations 51, 52 and 53, 54, and a pair of parallel resonant circuits 55 and 56. The resonant circuit 55 comprises the parallel combination of the tapped inductor 57 and the series connected capacitor 58 and 59 while the resonant circuit 56 comprises the parallel combination of the tapped inductor 60 and the series connected capacitors 61 and 62. The recited elements of the resonant circuits have electrical values selected to cause parallel resonance of each of the resonant circuits at a frequency $f_2$ where $f_2$ is less than the above referred to repetition frequency $f_1$ of the pulses 25. Output terminals 63, 64 and 65, between which the desired high level balanced sawtooth waveforms 66 and 67 are generated, as described hereinafter, are provided. The terminals 63 and 65 may be directly connected to or coupled by low impedance capacitive elements to the deflection plates of a beam display device for linearly deflecting a beam therein.

Figure 2:
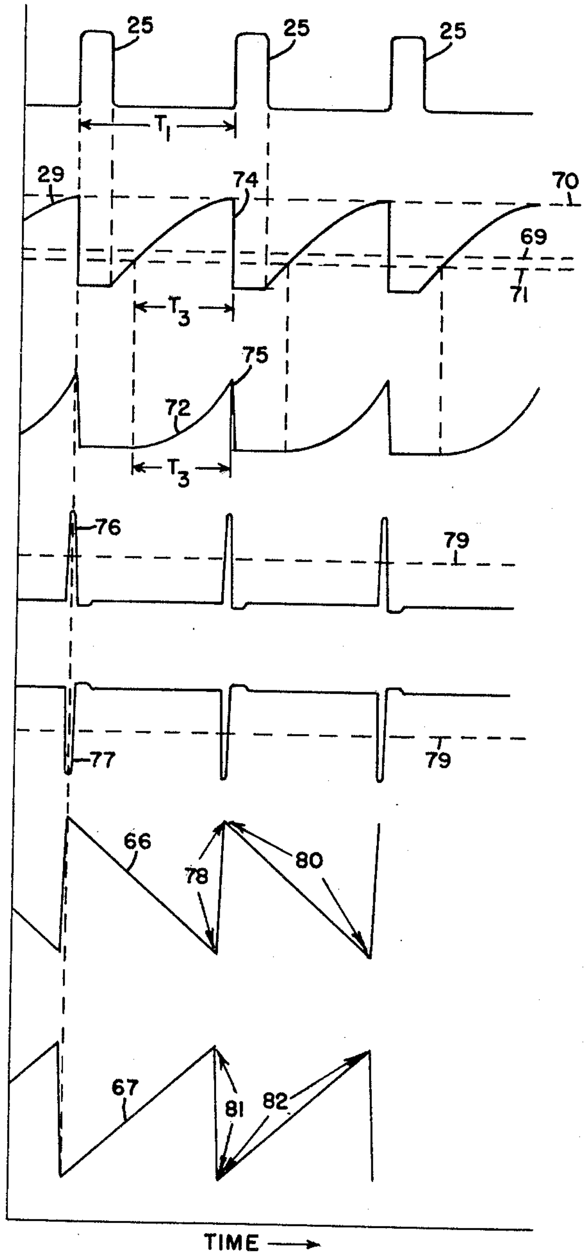
FIGURE 2 is a diagram illustrating the time relationship of the various voltage and current waveforms existing at various points in the circuit of the diagram of FIGURE 1.

The operation of the sawtooth voltage generator of FIGURE 1 may best be explained by concurrent reference to the waveforms illustrated in FIGURE 2. As previously indicated, the timing pulses 25 cause a low level sawtooth voltage waveform 29 to occur at the control electrode 31 of the driver pentode 33. The waveform 29 at the electrode 31 alternates about an average value of voltage 69 which is substantially below D.C. ground potential 70. When a positive going trace segment of the waveform 29 attains the plate current cut-off grid to cathode voltage 71 for the pentode driver tube 33, plate current having a waveform 72 flows in the inductor winding 13. The current will flow from the boost capacitor 36, described hereinafter, via the input terminal 18 on the winding to the input terminal 14 and to the anode 34 of the tube 33. This flow of current increases over an interval $T_3$ in accordance with the waveform 29 and establishes an increasing magnetic field about the inductor 11 during a period of time indicated as $T_3$ on FIGURE 2. A timing pulse 25 occurs to cause a retrace portion 74 of the waveform 29 to occur at electrode 31. The driver tube 33 is consequently driven back into a plate current cut-off state and the magnetic field existing about the inductor 11 when a peak current 75 was flowing in the winding 13 collapses. The collapsing magnetic field causes a positive voltage pulse 76 to occur between output terminals 17 and 18 and a similar but negative voltage pulse 77 to occur between output terminals 15 and 18. The amplitude of the pulses 76 and 77 is determined primarily by the peak-to-peak current 75, and transformer turns ratio. The pulse 76 will cause the diode 45 to become forward biased and the series capacitor combination 58 and 59 will be charged to the peak amplitude of the pulse 76 to form a retrace segment 78 of a high level sawtooth waveform 66 being generated. Additionally, the pulse 76 will cause a diode bias voltage to be developed across the capacitor 52. Subsequent to the occurrence of the pulse 76, the voltage across capacitor 52 will discharge through the resistor 51 but at a rate such as to maintain a cathode electrode 48 of the diode 49 at a more positive potential than a boost voltage level 79, as indicated in FIGURE 2. During a period intermediate the occurrence of pulses 76, the diode 45 will be back biased and a high impedance provided thereby to substantially isolate the resonant circuit 55 from the inductor 11. The energy coupled to the resonant circuit in the form of a charge on the capacitive branch 58, 59 causes the resonant circuit 55 to ring at its resonant frequency and provide a trace segment 80 of a high level waveform 66. In a similar manner, the negative pulse 77 causes energy to be transferred to the capacitive branch 61, 62 to generate a retrace segment 81 of a high level sawtooth waveform being generated. The negative pulse similarly provides a bias voltage across the RC combination 53, 54 and the resonant circuit 56 rings subsequent to occurrence of the pulse 77 to provide a trace segment 82 of a high level sawtooth voltage waveform 67.

The energy existing in the magnetic field of the inductor 11 when peak plate current 75 is flowing is of substantial magnitude and is not fully removed from the field of the inductor during the transfer of energy to the respective resonant circuits by the pulses 76 and 77. As is well known, the winding 13 of the inductor 11 and its associated winding capacity form a self resonant circuit. Inductors of the type 11 as described in FIGURE 1 generally have a self resonant frequency on the order of 70 kc. When pentode 33 is driven from peak plate current conduction 75 to plate current cut-off, the energy in the field of the inductor causes the self resonant circuit of the inductor to become excited and to ring sinusoidally at its self resonant frequency. The pulses 76 and 77 represent a first half-cycle of this sinusoidal ringing voltage. Since only the pulses 76 and 77 are desired in the output sawtooth waveform generating circuit, the remaining energy in the inductor must be removed if waveform distortion is to be avoided. To this end, a conventional damper diode 90 is provided and coupled to a tap 16 on the winding 13 and to the voltage supply 35. The diode 90 is poled for conduction during a negative alternation at the tap 16 of a second half cycle of the sinusoidal ringing voltage occurring in the self resonant circuit of inductor 11. The conduction of current in the diode 90 both damps further undesirable ringing and increases the voltage on the aforementioned boost capacitor 36 which is effectively connected in series with the voltage supply 35. Thus, energy is recovered in a conventional manner from the ringing circuit and utilized to increase the anode voltage of triode 22 and pentode 33 and the overall efficiency of the circuit.

Figure 3:
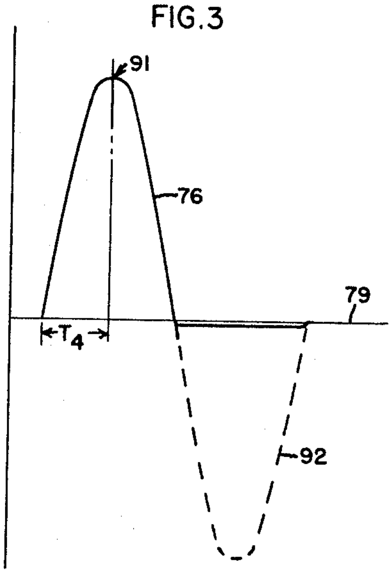
FIGURE 3 is a diagram illustrating the deviation of a retrace segment of a generated sawtooth waveform.

The high level voltage waveforms 66 and 67 exhibit a particularly short retrace time and a trace waveform having good linearity both because of the self resonant ringing frequency of the inductor 11 and the tuned frequency of the output circuits. Specifically, and with reference now to FIGURE 3, a greatly exaggerated voltage pulse 76 is illustrated in FIGURE 3. The capacitive branch of the resonant circuit 55 will charge to the peak amplitude 91 of the pulse 76 in the period of time $T_4$. The period $T_4$ thus determines the time of the retrace segment 78 in the output waveform 66. $T_4$ represents one-fourth of a cycle and for an inductor 11 having a self resonant frequency on the order of 70 kc., retrace time occurs in approximately 3.57 microseconds. The period $T_4$ is generally independent of the wave 29 and is determined primarily by the self resonant frequency of the inductor 11. Thus, by arranging the inductance and winding capacitance of inductor 11, a desired retrace time may be selected. A negative alternation 92 is indicated in dotted lines in FIGURE 3 to illustrate that portion of the ringing sinusoidal voltage variation previously referred to which is damped out and removed by the diode 90.

Figure 4:
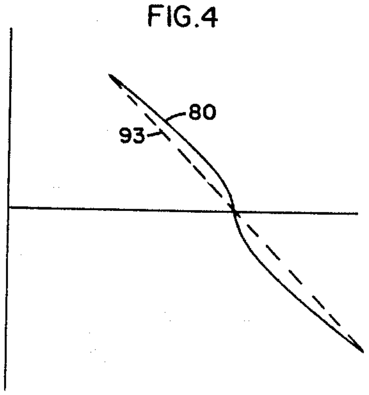
FIGURE 4 is a diagram illustrating the linearity of a trace segment of a generated sawtooth waveform.

FIGURE 4 illustrates a trace segment 80 of the waveform 66 with relation to an ideal trace segment 93 of a sawtooth waveform. The deviation of segment 80 from the ideal 93 is shown exaggerated in order to indicate the existence of such a deviation. It can be shown that the maximum variation of the slope of the trace segment 80 from the slope of the ideal sawtooth 93 is given approximately by:

$$\frac{\Delta \text{ slope } 80}{\text{slope } 93} \approx 50\pi^2\left(\frac{f_2}{f_1}\right)^2 \%$$

This percent was hereinbefore referred to and is hereafter referred to as the linearity characteristic of the generated waveform. Thus, the linearity characteristic can be improved by increasing the ratio of the tuned circuit frequency $f_2$ to the repetition frequency $f_1$ of the pulses 25. A ratio of 1/10 has provided a satisfactory linear sweep in the aforementioned light valve system.

Although the diodes 45 and 46 provide generally good isolation between the output resonant circuits and the inductor 11 in the circuit arrangement of FIGURE 1, some slight ripple content will be coupled from the inductor to the output resonant circuits. To avoid this undesirable coupling, a pair of neutralizing capacitors 94 and 95 are provided and connected between the diodes 45 and 46 as indicated. In addition, the capacitive branches of the output resonant circuits include, as previously indicated, capacitors 58, 59 and 61, 62 having junctions connected to taps on inductances 57 and 60. This arrangement is provided in order to avoid spurious resonance which may otherwise cause ripples in the output sawtooth if a single capacitor is utilized in each branch.

While it will be understood that the value of circuit components for the high level sawtooth waveform generator circuit of this invention may vary in order to satisfy individual requirements, the following circuit parameters have been found to provide satisfactory operation and are included herein along with magnitudes of pertinent voltages only by way of example as follows:

| | |
|---|---|
| Amplifying device **32** | 6CD6. |
| Diodes **45**, **46**, **90** | 6AX4–GTB. |
| Voltage supply **35** | 350 volts, D.C. |
| Resistors: | |
| **38** | 5K ohms, 5 watts. |
| **39** | 25K ohms potentiometer, 4 watts. |
| **51**, **53** | 40K ohms, 10 watts. |
| Capacitors: | |
| **40** | .1 μf. |
| **52**, **54** | .027 μf. |
| **58**, **59**, **61**, **62** | .0015 μf. |
| **36** | 50 μf., 350 volts. |
| **94**, **95** | 3 to 12 μμf. |

Inductors 57, 60: 3000 turns, center tapped universal winding wound on a ferrite standard television type line frequency transformer core with an air gap between core halves.

Inductor 11: 1300 turns, universal winding wound on a ferrite standard television type line frequency transformer core with a small air gap between halves. Turns measured from terminal 15 to:
- Tap 18—230 turns.
- Tap 17—460 turns.
- Tap 16—800 turns.
- Tap 14—1300 turns.

| | |
|---|---|
| Peak-to-peak amplitudes: | |
| Waveform **29** | 400 volts. |
| Waveform **66** | 1100 volts. |
| Waveform **67** | 1100 volts. |

Frequencies of operation:
- $f_1 \approx 15{,}750$ cycles per second.
- $f_2 \approx 1400$ cycles per second.

Although we have described in FIGURE 1 a circuit arrangement for providing linear high level balanced sawtooth voltage waveforms, a single phase circuit arrangement embodying the present invention may equally well be provided.

While we have illustrated and described and have pointed out in the annexed claims certain novel features of our invention, it will be understood that various omissions, substitutions and changes in the forms and details of the system illustrated may be made by those skilled in the art without departing from the spirit of the invention and the scope of the claims.

What we claim as new and desire to secure by Letters Patent of the United States is:

1. An apparatus for generating high level sawtooth voltage waveforms comprising: a source of electrical pulses having a repetition frequency $f_1$, said pulses having a small pulse width measured in time relative to a period of repetition of said pulses, a parallel resonant circuit across which a sawtooth voltage waveform is generated, said resonant circuit having a resonant frequency $f_2$, said frequencies $f_1$ and $f_2$ having the relation $$f_1>f_2$$

and means for coupling said pulses from said pulse source to said resonant circuit, said coupling means including a diode and means for reverse biasing said diode during a period of time intermediate the occurance of said pulses.

2. A sawtooth voltage generator comprising: an electrical circuit element for storing electrical energy in a field of the element; a source of electrical energy; means for coupling energy from said source to said storage element for causing the periodic establishment and collapse of the field of the element, said periodically collapsing field occurring at a frequency $f_1$; and a receptive electrical network for deriving energy from the storage element during the collapse of said field and generating a sawtooth voltage waveform therefrom, said receptive network including a parallel resonant circuit tuned to a frequency $f_2$ and across which a sawtooth voltage waveform is generated; said frequencies $f_1$ and $f_2$ having the relation $$f_1>f_2$$

and coupling means for automatically providing between said resonant circuit and said electrical storage element a low impedance during the occurrence of said collapsing field and a high impedance during the establishment of said field.

3. A sawtooth voltage generator comprising: an inductor for periodically storing electrical energy in a magnetic field; a source of electrical energy; means for coupling energy from said source to said inductor for causing the periodic establishment and collapse of a magnetic field of said inductor, said periodically collapsing field occurring at a frequency $f_1$; and a receptive electrical network for deriving energy from said inductor during the collapse of said field and generating a sawtooth voltage wave form therefrom, said receptive network including a parallel resonant circuit tuned to a frequency $f_2$ and across which a sawtooth voltage waveform is generated, said frequencies $f_1$ and $f_2$ having the relation $$f_1>f_2$$

and coupling means for automatically providing between said resonant circuit and said inductor a low impedance during the occurrence of said collapsing magnetic field and a high impedance during the establishment of said magnetic field.

4. A sawtooth voltage generator comprising: an inductor; a source of electrical energy; means for coupling energy from said source to said inductor for causing the periodic establishment and collapse of a magnetic field of said inductor; said periodically collapsing field occurring at a frequency $f_1$; a parallel resonant circuit across which a sawtooth voltage waveform is generated, said resonant circuit tuned to a frequency $f_2$; said frequencies $f_1$ and $f_2$ having the relation $$f_1>f_2$$

and coupling means for coupling energy from said inductor to said resonant circuit during the occurrence of said collapsing field, said coupling means including a unilateral circuit element poled for current conduction during the periodic occurrence of said collapsing field and means for biasing said unilateral element in a non-conductive state during the periodic establishment of said field.

5. An electrical apparatus for generating a relatively high level sawtooth voltage waveform comprising: an inductor having a winding including input and output terminals; a voltage source; an amplifying device having input and output electrodes; means coupling said inductor input terminals, said amplifying device output electrodes and said voltage source in series; a signal source providing an output voltage of frequency $f_1$ having a waveform for causing the periodic establishment and collapse of a magnetic field of said inductor when coupled to the input electrodes of said amplifying device; means coupling said output voltage from said signal source to said input electrodes; a parallel resonant circuit across which a relatively high level sawtooth voltage wave form is generated, said resonant circuit having a tuned frequency $f_2$; said frequencies $f_1$ and $f_2$ having the relation $$f_1>f_2$$

and means coupling said resonant circuit to said inductor output terminals, said latter coupling means including a diode and means for reverse biasing said diode during the establishment of said magnetic field.

6. The apparatus of claim 4 wherein said inductor comprises an autotransformer.

7. An electrical apparatus for generating a relatively high level sawtooth voltage waveform comprising: an electron discharge device having anode, cathode and control electrodes; an inductor having a winding and a pair of input and output terminals connected to said winding; a source of voltage; means connecting said anode to one of said input terminals of said inductor; means coupling said source of potential between said other inductor input terminal and said cathode electrode; a signal source providing a relatively low output voltage having a waveform of generally sawtooth shaped and frequency $f_1$; means coupling said signal source between said control and cathode electrodes; a parallel resonant circuit having a pair of output terminals between which terminals a relatively high level sawtooth waveform voltage is generated, said resonant circuit having a resonant frequency $f_2$; said frequencies $f_1$ and $f_2$ having the relation $$f_1>f_2$$

a diode; a bias circuit comprising a resistance and capacitance connected in parallel; means connecting said resonant circuit, said bias circuit and said diode in series; and means coupling said latter series connected circuit between said inductor output terminals.

8. An electrical apparatus for generating relatively high level balanced sawtooth voltage waveforms comprising: a transformer having a winding and a pair of input and output terminals connected thereto; a tap on said winding intermediate said output terminals; an amplifying device having a pair of input and output electrodes; a source of operating voltage; means connecting said transformer input terminals, said amplifying device output electrodes and said voltage source in series; a signal source providing an output voltage of frequency $f_1$ for causing the periodic establishment and collapse of a magnetic field of said transformer when coupled to the input electrodes of said amplifying device; means coupling said output voltage from said signal source to the input electrodes of said amplifying device; first and second parallel resonant circuits across each of which a relatively high level sawtooth voltage waveform is generated, said first and second resonant circuits each having a tuned frequency $f_2$; said frequencies $f_1$ and $f_2$ having the relation $$f_1>f_2$$

first means coupling said resonant circuit between a transformer output terminal and said tap; second means coupling said second resonant circuit between the other transformer output terminal and said tap; said first and second coupling means each including a diode having anode and cathode electrodes; said diodes poled for conducting during the collapse of said field; and means for reverse biasing said diodes during the establishment of said magnetic field.

9. The apparatus of claim 8 including a first neutralizing capacitor coupled between the diode anode of said first coupling means and the diode cathode of said second coupling means and a second neutralizing capacitor coupled between the diode cathode of said first coupling means and the diode anode of said second coupling means.

10. The apparatus of claim 8 wherein at least one of said resonant circuits includes a pair of series connected capacitors and an inductance having a tapped winding connected in parallel and means connecting said tap on said winding to a junction of said series connected capacitances.

References Cited by the Examiner

UNITED STATES PATENTS

| | | | |
|---|---|---|---|
| 2,662,198 | 12/53 | Starkes-Field | 315—27 |
| 2,869,029 | 1/59 | Dietch | 315—27 |
| 2,944,186 | 7/60 | Boekhorst et al. | 315—27 |

LLOYD McCOLLUM, *Primary Examiner.*